United States Patent
Wang et al.

(10) Patent No.: US 9,609,181 B2
(45) Date of Patent: Mar. 28, 2017

(54) IMAGE SIGNAL PROCESSOR AND METHOD FOR SYNTHESIZING SUPER-RESOLUTION IMAGES FROM NON-LINEAR DISTORTED IMAGES

(75) Inventors: Qinhe Wang, Fukuoka (JP); Kenji Tabei, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 283 days.

(21) Appl. No.: 13/992,807

(22) PCT Filed: Dec. 20, 2011

(86) PCT No.: PCT/JP2011/007107
§ 371 (c)(1),
(2), (4) Date: Jun. 10, 2013

(87) PCT Pub. No.: WO2012/090434
PCT Pub. Date: Jul. 5, 2012

(65) Prior Publication Data
US 2013/0258048 A1    Oct. 3, 2013

(30) Foreign Application Priority Data

Dec. 27, 2010   (JP) .................. 2010-289911

(51) Int. Cl.
H04N 5/217   (2011.01)
H04N 5/232   (2006.01)
(Continued)

(52) U.S. Cl.
CPC ......... H04N 5/2173 (2013.01); G06T 3/4053 (2013.01); H04N 1/387 (2013.01);
(Continued)

(58) Field of Classification Search
CPC .... H04N 1/387; H04N 1/407; H04N 1/32208; H04N 5/2628; H04N 5/23238; H04N 5/2173; H04N 5/232; G06T 3/00
(Continued)

(56) References Cited

U.S. PATENT DOCUMENTS 5,696,848 A   12/1997  Patti et al.
7,643,064 B1 * 1/2010  Jouppi .................. H04N 5/232
                                                    348/211.9
(Continued)

FOREIGN PATENT DOCUMENTS

| JP | 09-018685 | 1/1997 |
| JP | 2008-091979 | 4/2008 |
| JP | 2008-117416 | 5/2008 |

OTHER PUBLICATIONS

Extended European Search Report from the European Patent Office, mailed Dec. 18, 2014, for the corresponding European Patent Application No. 11852336.4.
(Continued)

*Primary Examiner* — Jay Patel
*Assistant Examiner* — Marnie Matt
(74) *Attorney, Agent, or Firm* — Greenblum & Bernstein, P.L.C.

(57) ABSTRACT

An image signal processing apparatus and image signal processing method obtains a high super-resolution effect for distorted images captured by a specialized optical system, such as a 360-degree camera. A distortion-correction conversion-formula calculation section calculates a distortion correction conversion formula for correcting the nonlinear distortion. A distortion correction and interpolation processing section performs distortion correction and interpolation processing on each cropped region. An alignment conversion formula calculation section calculates an alignment conversion formula for alignment between each cropped
(Continued)

image after distortion correction and interpolation processing is completed. A pixel coordinate conversion section rearranges pixel coordinates for each frame image before interpolation processing by using the distortion correction conversion formula and the alignment conversion formula corresponding to the cropped regions. An image synthesis section synthesizes the cropped images.

13 Claims, 8 Drawing Sheets

(51) Int. Cl.
    *H04N 5/262*     (2006.01)
    *H04N 1/387*     (2006.01)
    *H04N 1/407*     (2006.01)
    *G06T 3/40*     (2006.01)

(52) U.S. Cl.
    CPC ......... *H04N 1/407* (2013.01); *H04N 5/23238* (2013.01); *H04N 5/2628* (2013.01)

(58) Field of Classification Search
    USPC .......................................................... 348/38
    See application file for complete search history.

(56) References Cited

U.S. PATENT DOCUMENTS

| | | | | |
|---|---|---|---|---|
| 7,840,095 | B2 * | 11/2010 | Yamada | G06T 3/4053 348/152 |
| 8,306,121 | B2 | 11/2012 | Jia | |
| 8,896,703 | B2 * | 11/2014 | Corcoran | G06T 3/0062 348/169 |
| 2002/0122113 | A1 * | 9/2002 | Foote | G06T 3/4038 348/48 |
| 2002/0141005 | A1 * | 10/2002 | Okisu | G06T 3/4053 358/540 |
| 2003/0103063 | A1 * | 6/2003 | Mojaver | G06T 3/00 345/647 |
| 2004/0095470 | A1 * | 5/2004 | Tecu | H04N 5/3572 348/207.99 |
| 2006/0017807 | A1 * | 1/2006 | Lee | B60R 1/00 348/36 |
| 2007/0041664 | A1 * | 2/2007 | Yamada | G06T 3/4053 382/299 |
| 2007/0211960 | A1 * | 9/2007 | Sasaki | H04N 5/3572 382/275 |
| 2007/0252905 | A1 * | 11/2007 | Kamiya | G06T 3/60 348/241 |
| 2009/0232213 | A1 | 9/2009 | Jia | |
| 2009/0304299 | A1 * | 12/2009 | Motomura | G06T 3/4007 382/254 |
| 2010/0119172 | A1 * | 5/2010 | Yu | G06T 5/006 382/256 |
| 2010/0254630 | A1 * | 10/2010 | Ali | G06T 3/4053 382/300 |
| 2011/0081094 | A1 * | 4/2011 | Damkat | G06T 3/4053 382/254 |
| 2013/0128087 | A1 * | 5/2013 | Georgiev | H04N 5/2254 348/307 |

OTHER PUBLICATIONS

International Search Report, mailed Apr. 3, 2012, for International Application No. PCT/JP2011/007107.

* cited by examiner

IMAGE SIGNAL PROCESSOR AND METHOD FOR SYNTHESIZING SUPER-RESOLUTION IMAGES FROM NON-LINEAR DISTORTED IMAGES

TECHNICAL FIELD

The present invention relates to a technology that performs super-resolution processing on a photographed image having non-linear distortion, which has been photographed particularly by a camera having a special optical system, such as a 360-degree camera.

BACKGROUND ART

As a so-called super-resolution technology to enhance the resolution of photographed images, a variety of technologies that combine a plurality of photographed images to enhance the resolution of the images have been proposed heretofore (see, e.g., Patent Literatures (hereinafter, abbreviated as "PTL") 1 and 2).

Figure 1:
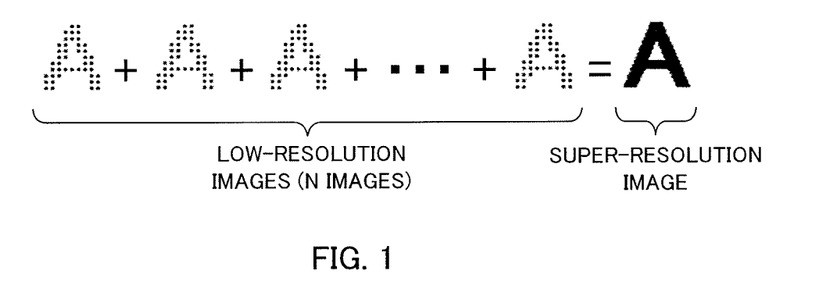
FIG. 1 is a diagram showing an image of a super-resolution technology using a plurality of photographed images.

FIG. 1 shows an image obtained by a super-resolution technology using a plurality of photographed images. As depicted in the figure, a super-resolution image is formed by synthesizing a plurality of (N) low-resolution images. Specifically, alignment with sub-pixel (smaller than one-pixel size) accuracy is performed first on a plurality of low-resolution images of the same subject photographed using a camera. Then, the plurality of images after the alignment are synthesized. As a result, the resolution of the synthesized image (super-resolution image) is enhanced because the number of spatial sample points increases and the sampling frequency increases accordingly.

CITATION LIST

Patent Literature

PTL 1
Japanese Patent Application Laid-Open No. 2008-091979
PTL 2
Japanese Patent Application Laid-Open No. 2008-117416

SUMMARY OF INVENTION

Technical Problem

Meanwhile, the alignment of a subject is required in the super-resolution technology that uses a plurality of images as described above.

Figure 2:
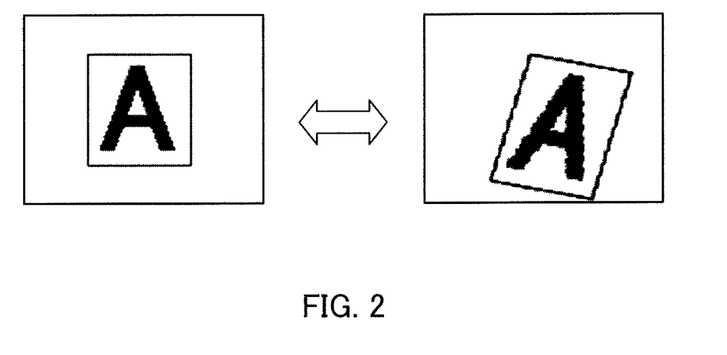
FIG. 2 is a diagram showing an image of a linear conversion between frames.

This alignment can be performed by linear conversion such as translation, scaling, reflection, rotation, and shearing between frames as shown in FIG. 2 when the projection system of the camera optical system is a perspective projection system.

However, when the camera optical system is a special projection system (such as one that uses an ultra-wide angle lens, a fisheye lens, or an all-around mirror), non-linear distortion occur within photographed images, and it is therefore difficult to perform alignment by using only linear conversion.

To perform super-resolution processing by using a plurality of images photographed using such a special projection system, conversion from a specially projected image to a perspectively projected image, i.e., distortion correction is performed first, and then alignment for synthesis is performed.

However, distortion correction generally involves interpolation processing, and aliasing high-frequency components included in source images are lost due to the influence of the interpolation processing. Thus, the effect of super-resolution is reduced. Incidentally, even when distortion correction involving no interpolation processing is performed, pixel positions in images after the distortion correction differ in units of subpixels; therefore, in order to perform high-accuracy alignment using matching, interpolation processing to generate corresponding pixels is necessary. Hence, aliasing high-frequency components included in source images are lost in this case as well, and therefore the effect of super-resolution is reduced.

The present invention has been made in view of the above-noted points, and it is an object of the present invention to provide a video signal processing apparatus and a video signal processing method by which a high super-resolution effect can be produced on distorted images photographed by using a special optical system such as a 360-degree camera.

Solution to Problem

A video signal processing apparatus according to an aspect of the present invention uses a plurality of frame images differing in non-linear distortion according to a cropped position and thereby obtains a super-resolution image, the apparatus including: a first coordinate conversion formula calculation section that obtains, for each frame, a first coordinate conversion formula for correcting non-linear distortion in a cropped region of each of the frame images; a distortion correction and interpolation processing section that performs distortion correction on the cropped region of each of the frame images by using the first coordinate conversion formula corresponding to the cropped region and performs interpolation processing on each of the cropped images on which the distortion correction has been performed; a second coordinate conversion formula calculation section that obtains a second coordinate conversion formula for alignment between cropped images on a basis of results of matching between cropped images by using each of the cropped images on which the distortion correction and interpolation processing have been performed; a pixel coordinate conversion section that performs rearrangement of pixel coordinates on each of the frame images on which the distortion correction and interpolation processing are not performed, by using the first coordinate conversion formula corresponding to the cropped region of the frame image and the second coordinate conversion formula corresponding to the cropped image; and a synthesis section that synthesizes the cropped images in each of which the rearrangement has been made, the cropped images corresponding to the plurality of frames and being obtained by the pixel coordinate conversion section.

A video signal processing method according to an aspect of the present invention is a method of using a plurality of frame images differing in non-linear distortion according to a cropped position and thereby obtaining a super-resolution image, the method including: a first coordinate conversion formula calculation step of obtaining, for each frame, a first coordinate conversion formula for correcting non-linear distortion in a cropped region of each of the frame images; a distortion correction and interpolation processing step of performing distortion correction on the cropped region of each of the frame images by using the first coordinate conversion formula corresponding to the cropped region and performing interpolation processing on each of the cropped images on which the distortion correction has been performed; a second coordinate conversion formula calculation step of obtaining a second coordinate conversion formula for alignment between cropped images on a basis of results of matching between cropped images by using each of the cropped images on which the distortion correction and interpolation processing have been performed; a pixel coordinate conversion step of performing rearrangement of pixel coordinates on each of the frame images on which the distortion correction and interpolation processing are not performed, by using the first coordinate conversion formula corresponding to the cropped region of the frame image and the second coordinate conversion formula corresponding to the cropped image; and a synthesis step of synthesizing the cropped images in each of which the rearrangement has been made, the cropped images corresponding to the plurality of frames and being obtained in the pixel coordinate conversion step.

Advantageous Effects of Invention

According to the present invention, images on which distortion correction processing and interpolation processing have been performed are used to calculate coordinates for alignment between frame images, but pixel values of source images before interpolation processing is performed are used for actual synthesis without any change. Thus, no aliasing high-frequency components are lost in the plurality of cropped images on which alignment has been performed and which are used for the synthesis. As a result of this, a synthesized image with the remaining high-frequency components (super-resolution image) can be obtained, and a high super-resolution effect can be thus obtained.

BRIEF DESCRIPTION OF DRAWINGS

FIGS. 5A, 5B, and 5C are diagrams showing images of distortion correction and alignment processing.

FIGS. 6A, 6B, and 6C are diagrams showing images of pixel rearrangement and synthesis processing.

DESCRIPTION OF EMBODIMENTS

An embodiment of the present invention will be described in detail below with reference to the accompanying drawings.

[1] Overall Configuration

Figure 3:
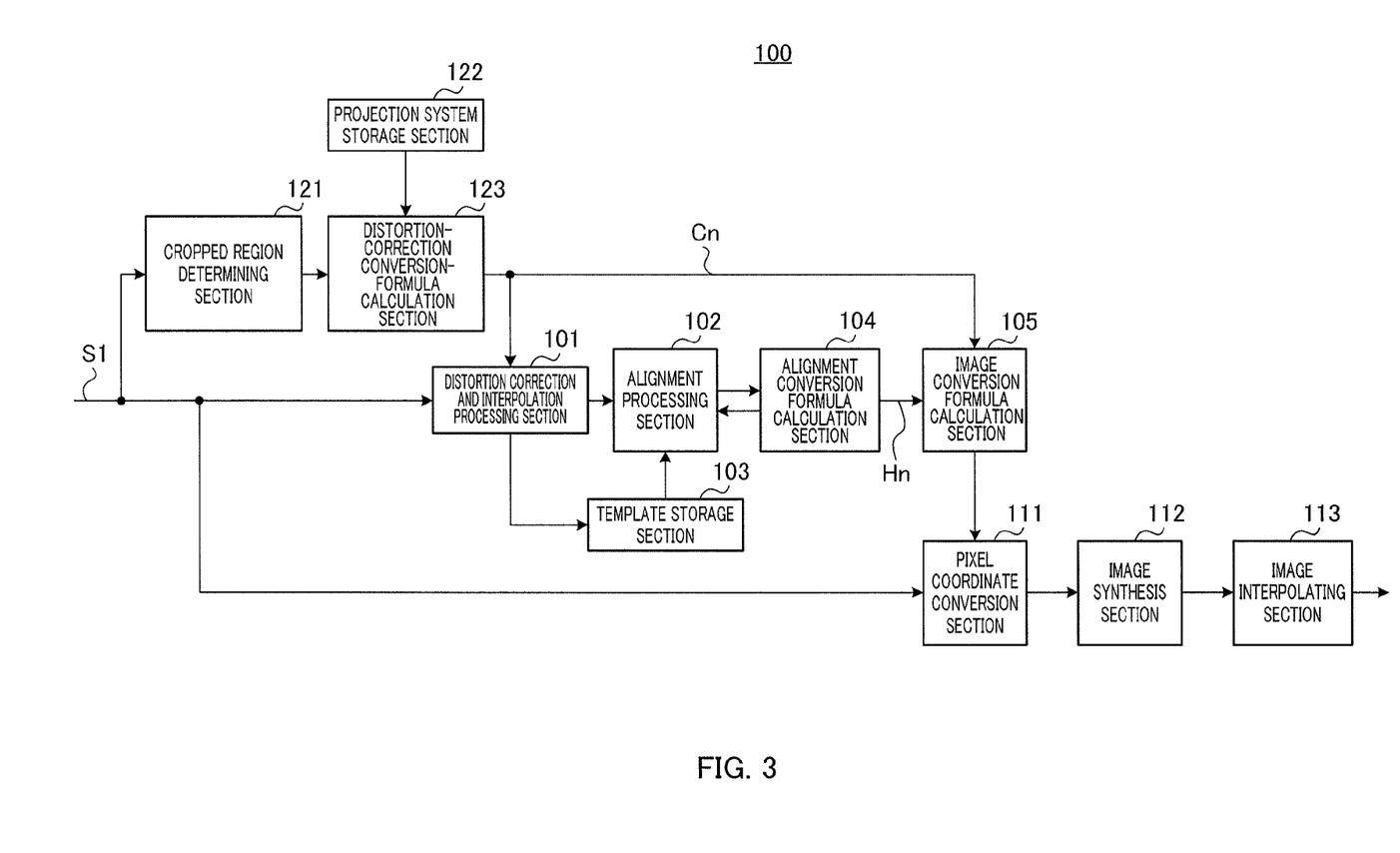
FIG. 3 is a block diagram showing a configuration of a video signal processing apparatus according to an embodiment.

FIG. 3 shows the configuration of a video signal processing apparatus according to the present embodiment. Video signal processing apparatus 100 is configured to use a plurality of frame images differing in non-linear distortion according to cropped positions in the frames and thereby to obtain a super-resolution image.

Cropped region determining section 121 determines a cropped region to be cropped from input image S1. The term "cropped region" refers to a region of interest in a frame image, i.e., a region including a super-resolution processing target such as a human. The determination of the cropped region can be made, for example, by tracking the target. Methods for determining the cropped region will be described in detail hereinafter. Note that although the example of FIG. 3 illustrates a method of causing cropped region determining section 121 to receive input image S1 and automatically determining a cropped region by tracking, the cropped region may be a user-designated region. Positional information on the cropped region determined by cropped region determining section 121 is outputted to distortion-correction conversion-formula calculation section 123.

Projection system storage section 122 stores therein a parameter corresponding to a projection system for a special optical system. The parameter for distortion may also be referred to as an optical parameter for the camera that photographs input image S1. That is, for the special projection system for a 360-degree camera, for example, distortion differs in degree according to a position in one frame; therefore, projection system storage section 122 stores therein a parameter for calculating the degree of distortion corresponding to the position in one frame.

Distortion-correction conversion-formula calculation section 123 reads positional information on the cropped region from cropped region determining section 121 and the optical parameters from projection system storage section 122, and then calculates a conversion formula for the distortion correction by using the positional information on the cropped region and the optical parameter. In this way, distortion-correction conversion-formula calculation section 123 obtains, for each frame, first coordinate conversion formula $C_n$ for correcting non-linear distortion in the cropped region in each frame image. In this embodiment, $C_n$ denotes a distortion correction conversion formula (first coordinate conversion formula) for a cropped region in an n-th frame. In the case of the present embodiment, $C_n$ denotes a coordinate conversion formula calculated based on the projection system.

Distortion correction and interpolation processing section 101 receives input images S1 corresponding to a plurality of frames and also receives distortion correction conversion formula $C_n$ from distortion-correction conversion-formula calculation section 123. Distortion correction and interpolation processing section 101 performs distortion correction on the cropped regions of input images S1 of a plurality of frames by using distortion correction conversion formula $C_n$. Furthermore, distortion correction and interpolation processing section 101 performs interpolation processing on the cropped images obtained by the distortion correction. That is, distortion correction and interpolation processing section 101 performs distortion correction on each frame image by using distortion correction conversion formula (first coordinate conversion formula) $C_n$ corresponding to the cropped region and also performs interpolation processing on each cropped image obtained by the distortion correction. This processing produces images which can be used for alignment to be performed at the subsequent component, alignment processing section 102. Incidentally, in order to perform pattern matching between images in which different distortion correction has been made, it is necessary to perform interpolation processing to generate pixels at corresponding positions, and thus distortion correction and interpolation processing section 101 is configured to perform interpolation processing in addition to distortion correction.

Distortion correction and interpolation processing section 101 outputs one of input images S1 corresponding to a plurality of frames to template storage section 103 after performing distortion correction and interpolation processing on the input image, and sequentially outputs the other frame images to alignment processing section 102 after performing distortion correction and interpolation processing on the frame images. That is, template storage section 103 stores therein a cropped image obtained by performing distortion correction and interpolation processing on the initial frame image, for example, of a plurality of frame images.

Alignment processing section 102 performs matching processing on a template image stored in template storage section 103 with the cropped images sequentially received as input from distortion correction and interpolation processing section 101 to perform alignment processing. Specifically, alignment processing section 102 and alignment conversion formula calculation section 104 perform the pattern matching processing, cooperatively, and alignment conversion formula (second coordinate conversion formula) $H_n$ for performing alignment between the cropped images can finally be obtained at alignment conversion formula calculation section 104. This alignment calculation formula $H_n$ is sent to image conversion formula calculation section 105. Incidentally, $H_n$ denotes alignment conversion formula (second coordinate conversion formula) for a cropped image cropped from the n-th frame. In the case of the present embodiment, $H_n$ denotes a conversion matrix.

Image conversion formula calculation section 105 receives from distortion-correction conversion-formula calculation section 123, distortion correction conversion formula $C_n$ corresponding to the cropped region in each of the frame images and also receives alignment conversion formula $H_n$ corresponding to each of the cropped images from alignment conversion formula calculation section 104. Image conversion formula calculation section 105 integrates distortion correction conversion formula and alignment conversion formula $H_n$ for each of the frame images and sends the resultant formula to pixel coordinate conversion section 111 as the integrated coordinate conversion formula.

Pixel coordinate conversion section 111 receives images S1 corresponding to a plurality of frames from image conversion formula calculation section 105, and also receives the conversion formula obtained by integrating the distortion correction conversion formula (first coordinate conversion formula) and the alignment conversion formula (second coordinate conversion formula) therefrom. Pixel coordinate conversion section 111 converts the pixel coordinates in each of the cropped regions by using the image conversion formula corresponding to each of the frame images.

Accordingly, pixel coordinate conversion section 111 by uses the image conversion formula (first and second coordinate conversion formulas) corresponding to the cropped region and rearranges the pixel coordinates in each of the frame images on which the interpolation processing has not been performed. As a result, the cropped images corresponding to a plurality of frames can be obtained in which cropped images, the pixel coordinates have been rearranged, i.e., distortion correction and alignment have been performed. Since no interpolation processing is performed on the cropped images corresponding to the plurality of frames in which the rearrangement has been performed, no aliasing high-frequency components are lost from the cropped images.

Image synthesis section 112 synthesizes the cropped images corresponding to the plurality of frames obtained by pixel coordinate conversion section 111. Consequently, the synthesized image with an enhanced resolution (super-resolution image) can be obtained.

Image interpolating section 113 performs interpolation processing on the synthesized image. At this stage, the pixel positions in the cropped images that have been synthesized by image synthesis section 112 are not the same because of differences in degree of distortion in the cropped images or the like (pixels in decimal accuracy are arranged). For this reason, the pixels of the synthesized image are not necessarily at specified positions. Thus, image interpolating section 113 generates pixels at the specified positions by interpolation.

[2] Processing by Cropped Region Determining Section

Figure 4:
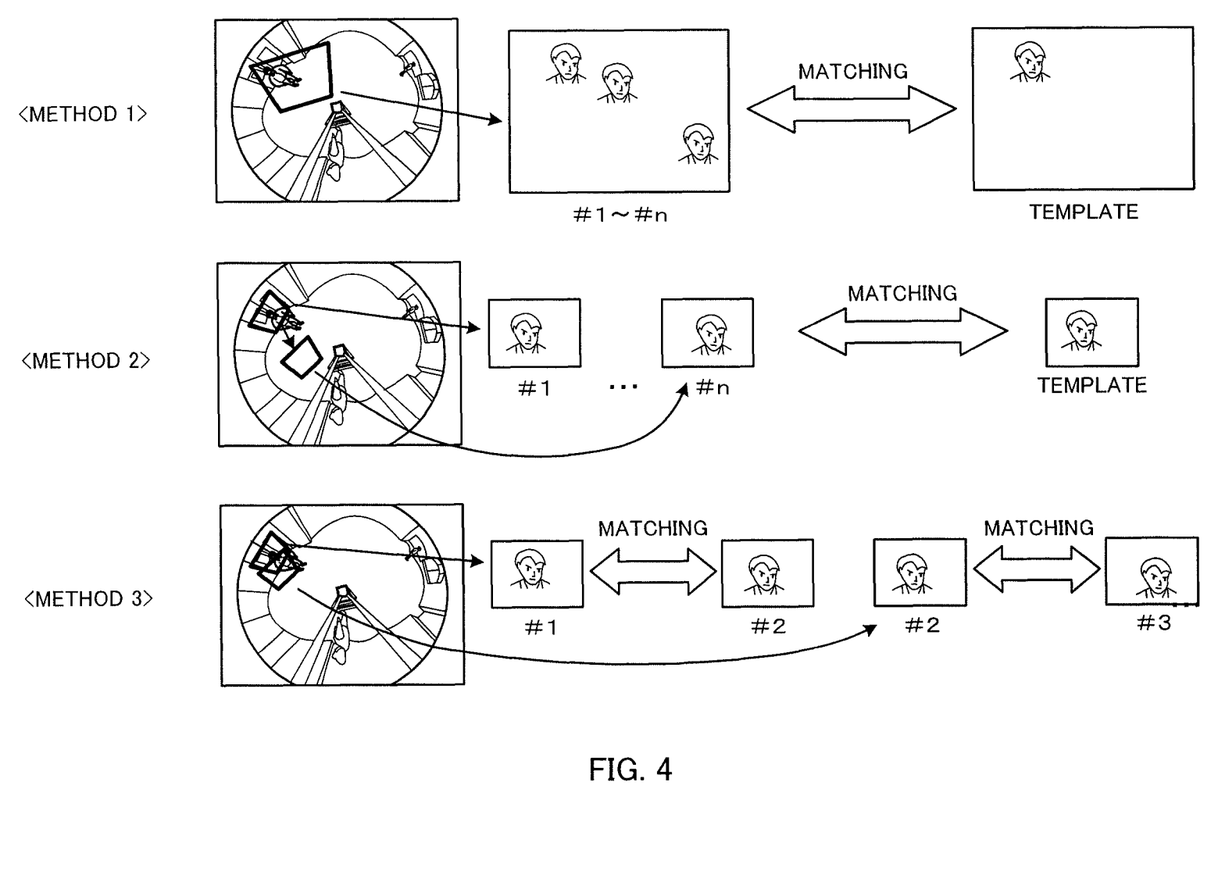
FIG. 4 is a diagram used for describing cropped region determination methods.

Next, how a region is cropped by cropped region determining section 121 will be described. In the present embodiment, three region cropped methods, i.e., <Method 1>, <Method 2>, and <Method 3> will be presented as shown in FIG. 4.

<Method 1>

Method 1 is a method to set the same cropped region in a plurality of frames #1 to #n. This method is based on the hypothesis that the moving speed of target such as a person is not so high that the target remains within the same cropped region over a plurality of adjacent frames. Note that, this method sets each cropped region in size larger than the size of a cropped region to be set by <Method 2> and <Method 3> to be described below.

<Method 2>

Method 2 can be referred to as a target tracking method. This method tracks a target for each frame and changes the cropped region in each of frames #1 to #n according to the movement of the target.

<Method 3>

Method 3 can be referred to as an inter-frame matching method. This method sets the same cropped region in adjacent frames, but changes the cropped region according to matching results. For example, the same cropped region is set in frames #1 and #2, and the same cropped region is set in frames #2 and #3. In addition, the cropped region set in frames #2 and #3 is set in such a way that the subject (human) is nearly centered upon the cropped region according to the results of matching between images in the cropped regions in frames #1 and #2 and a template image.

[3] How Distortion Correction, Interpolation, Alignment, Pixel Rearrangement, and Synthesis Processing are Performed Next, how processing is performed by video signal processing apparatus 100 will be described with reference to FIG. 5 and FIG. 6. FIG. 5 show how distortion correction and alignment processing are performed; and FIG. 6 show how pixel rearrangement and synthesis processing are performed.

Figures 5A, 5B:
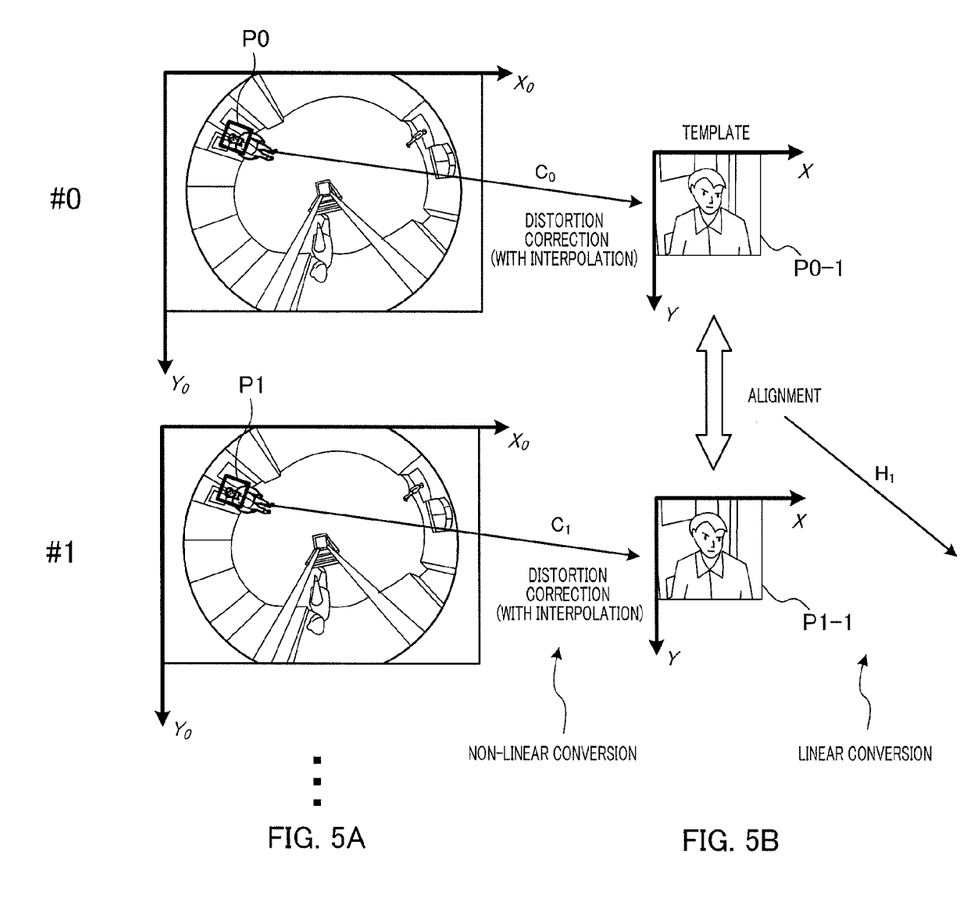
FIG. 5A is a diagram showing cropped regions in respective frames.
FIG. 5B is a diagram showing cropped images on which the distortion correction and interpolation processing have been performed.

First, distortion correction made performed by distortion correction and interpolation processing section 101 and alignment processing performed by alignment processing section 102 will be described with reference to FIG. 5. Initially, as shown in FIG. 5A, cropped region determining section 121 determines cropped regions P0, P1, . . . in respective frames #0, #1, #2, . . . . Subsequently, distortion correction and interpolation processing section 101 performs distortion correction and interpolation processing on cropped regions P0, P1, . . . in respective frames #0, #1, #2, . . . . As a result, alignment images, P0-1, P1-1, . . . are formed as shown in FIG. 5B.

As shown in FIG. 5B, image P0-1, which has been obtained by performing distortion correction and interpolation processing on cropped region P0 in frame #0, is used as a template image; and images P1-1, . . . , which have been obtained by performing distortion correction and interpolation processing in cropped regions P1, . . . in frames #1, #2, . . . , are used as cropped images for alignment P1-1, . . . .

Distortion correction to be performed on cropped region Pn in the n-th frame can be expressed by the following non-linear arithmetic equations where $C_0$, $C_1$, $C_2$, . . . , respectively, denote distortion correction conversion formulas for cropped regions P0, P1, . . . in respective frames #0, #1, #2, . . . ; $(X_0, Y_0)$ denote the coordinates of a pixel before distortion correction; and (x, y) denote the coordinates of the pixel after the distortion correction.

[1]

$$x = C_{n\,x}(X_0, Y_0)$$

$$y = C_{n\,y}(X_0, Y_0) \quad \text{(Equation 1)}$$

In equation 1, $C_{n\,x}$ denotes a distortion conversion formula for an x component in cropped region Pn in the n-th frame, and $C_{n\,y}$ denotes a distortion conversion formula for a y component in cropped region Pn in the n-th frame.

Next, alignment of cropped images P1-1, with template image P0-1 is performed using template image P0-1 as the basis for the alignment. That is, alignment conversion formulas are calculated for alignment of each of cropped images P1-1, . . . with template image P0-1.

Here, the alignment conversion of cropped image Pn-1 in the n-th frame can be expressed by the following linear arithmetic equation where $H_1$, $H_2$, . . . , denote alignment conversion formulas (conversion matrices) for cropped images P1-1, P2-1, . . . , respectively, after the distortion correction and interpolation processing in respective frames #1, #2, . . . ; (x, y) denote the coordinates of a pixel before the alignment; and (x', y') denote the coordinates of the pixel after the alignment.

[2]

$$\begin{pmatrix} x' \\ y' \\ 1 \end{pmatrix} = H_n \cdot \begin{pmatrix} x \\ y \\ 1 \end{pmatrix} \quad \text{(Equation 2)}$$

Figure 5C:
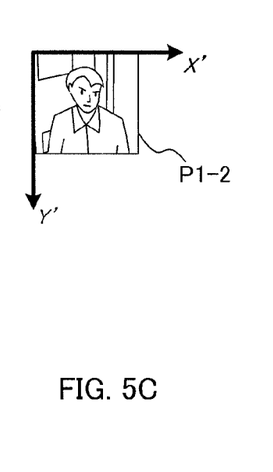
FIG. 5C is a diagram showing a cropped image on which alignment is performed.

As shown in FIG. 5C, by using the linear operational formula of Expression (2), cropped image P1-1 is converted to cropped image P1-2 positioned with template image P0-1.

Next, a description will be provided with reference to FIG. 6 regarding pixel coordinate conversion processing performed by pixel coordinate conversion section 111 and synthesis interpolation processing performed by image synthesis section 112 and image interpolating section 113.

Figure 6A:
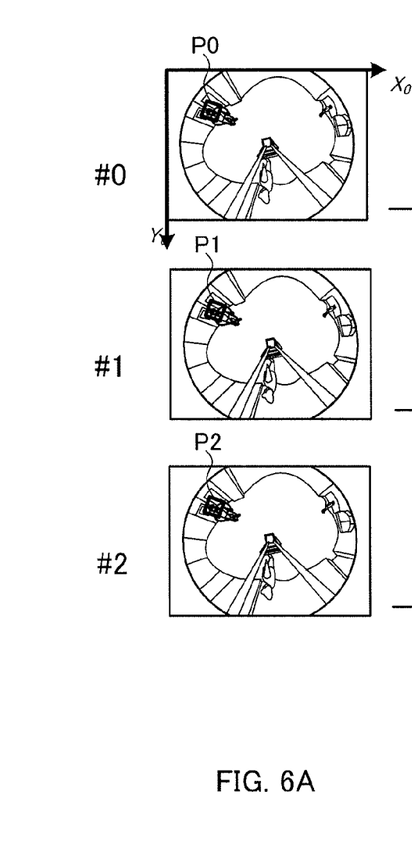
FIG. 6A is a diagram showing the cropped regions in the respective frames.
Figure 6B:
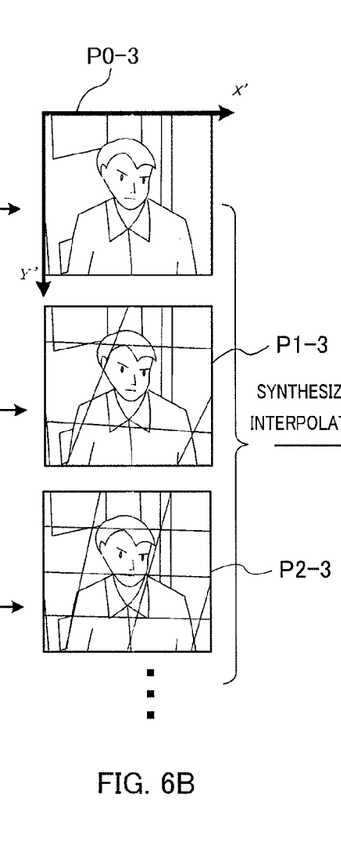
FIG. 6B is a diagram showing cropped images after the rearrangement.
Figure 6C:
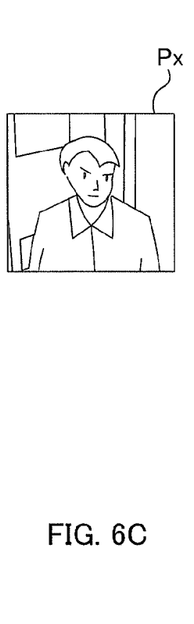
FIG. 6C is a diagram showing a synthesized cropped image.

As shown in FIG. 6A, pixel coordinate conversion section 111 performs pixel rearrangement on cropped regions P0, P1, P2, . . . in respective input frames #0, #1, #2, . . . by using the image conversion formulas (each being a formula obtained by integrating equation 1 and equation 2. FIG. 6B shows cropped images P0-3, P1-3, P2-3, . . . after the rearrangement.

Next, image synthesis section 112 synthesizes cropped images P0-3, P1-3, P2-3, . . . , which have been subjected to the rearrangement, into one image. Thereafter, image interpolating section 113 interpolates the synthesized image to produce super-resolution image Px shown in FIG. 6C.

[4] Operation

Next, the operation of video signal processing apparatus 100 according to the present embodiment will be described with reference to a flowchart.

Figure 7:
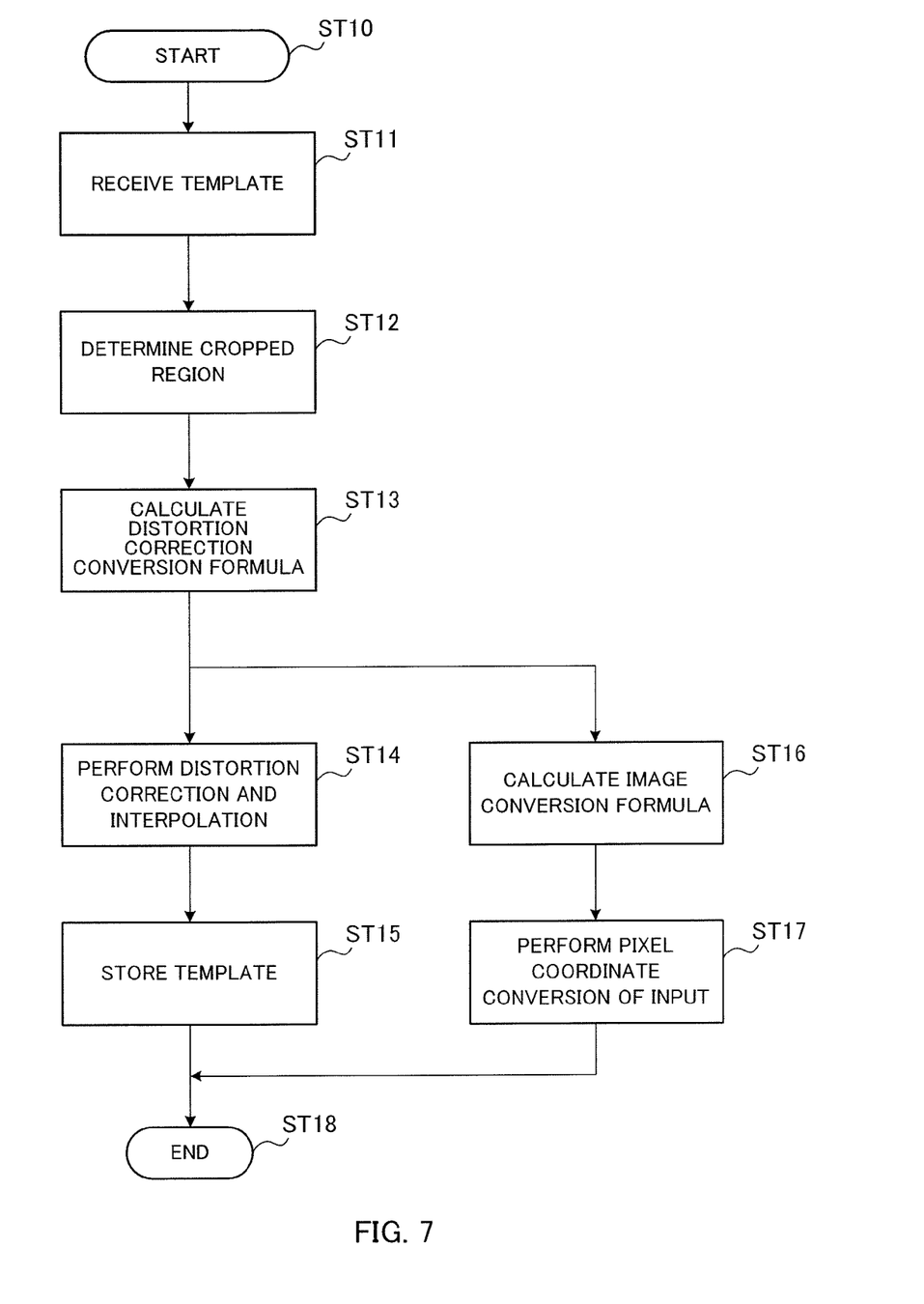
FIG. 7 is a flowchart illustrating a processing procedure for a template image.

FIG. 7 illustrates a processing procedure for a template image (template processing procedure).

Video signal processing apparatus 100 starts template processing at step ST10 and receives input images S1 including a template image at step ST11. At step ST12, cropped region determining section 121 determines a region to be cropped. At step ST13, distortion-correction conversion-formula calculation section 123 calculates a distortion correction conversion formula for the template image. At step ST14, distortion correction and interpolation processing section 101 performs distortion correction and interpolation processing on the template image. At step ST15, the template image after the distortion correction and interpolation processing is stored in template storage section 103. At step ST16, image conversion formula calculation section 105 calculates an image conversion formula for the template image. Note that the image conversion formula for the template image includes no alignment conversion formula, i.e., consists of the distortion correction conversion formula. At step ST17, pixel coordinate conversion section 111 performs pixel coordinate conversion (pixel rearrangement) on the template image by using the image conversion formula. The template processing ends at step ST18.

Figure 8:
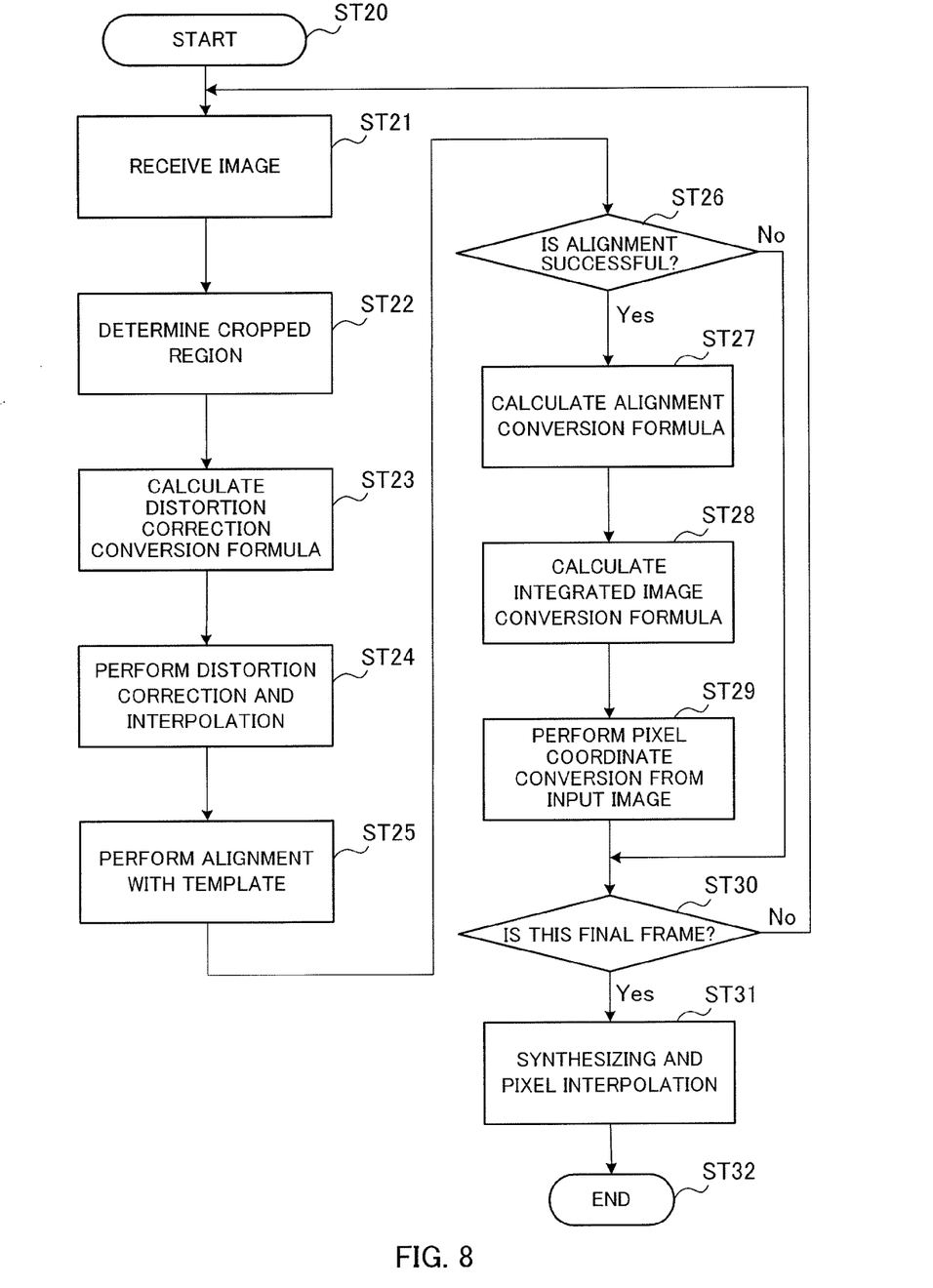
FIG. 8 is a flowchart illustrating a processing procedure for cropped images other than the template image.

FIG. 8 illustrates a processing procedure for cropped images other than the template image (non-template image processing procedure).

Video signal processing apparatus 100 starts non-template image processing at step ST20 and receives frame images at step ST21 to begin with. At step ST22, cropped region determining section 121 determines regions to be cropped. At step ST23, distortion-correction conversion-formula calculation section 123 calculates a distortion correction conversion formula for each of the cropped regions. At step ST24, distortion correction and interpolation processing section 101 performs distortion correction using the distortion correction conversion formula and interpolation processing on the cropped region. At step ST25, alignment processing section 102 performs alignment of the cropped image on which the distortion correction and interpolation processing have been performed with the template image. At step ST26, whether the alignment is successful is determined. If the alignment is successful (Step ST26; Yes), the processing proceeds to step ST27. At step ST27, alignment conversion formula calculation section 104 calculates the final alignment conversion formula.

If the alignment is not successful at step ST26, this means that there is no target that matches the template image within the cropped image (e.g., a state in which the state of the target in the cropped image has considerably changed relative to the target in the template image, so that pattern matching cannot be made). In such a case, the alignment is stopped, and the processing proceeds to step ST30.

At step ST28, image conversion formula calculation section 105 integrates the distortion correction conversion formula and the alignment conversion formula to calculate the image conversion formula. At step ST29, pixel coordinate conversion section 111 performs pixel coordinate conversion on each of the input images by using the image conversion formula obtained by the integration. As a result, the cropped image in which pixel coordinates have been rearranged is obtained. At step ST30, whether or not the current processing target is the last frame is determined. If the processing target is the last frame (step ST30; Yes), the processing proceeds to step ST31; and if the processing target is not the last frame (step ST30; No), the processing returns to step ST21. As described above, the processing at steps ST21 to ST30 is repeated sequentially on the cropped images in the respective frames until a predetermined last frame.

After the cropped images corresponding to the plurality of frames including the initial frame to the last frame, which have been subjected to the pixel coordinate conversion, are formed, the processing in video signal processing apparatus 100 proceeds to step ST31. At step ST31, image synthesis section 112 synthesizes the cropped images corresponding to the plurality of frames, which have been subjected to the pixel coordinate conversion. Thereafter, image interpolating section 113 performs interpolation processing on the synthesized image. The non-template image processing ends at step ST32.

[5] Effects

As described above, video signal processing apparatus 100 according to the present embodiment includes: distortion-correction conversion-formula calculation section 123 that calculates, for each frame, a distortion correction conversion formula (first coordinate conversion formula) for correcting a non-linear distortion in a cropped region in each frame image; distortion correction and interpolation processing section 101 that performs distortion correction and interpolation processing on the cropped region; alignment conversion formula calculation section 104 that calculates an alignment conversion formula (second coordinate conversion formula) for alignment between cropped images on which the distortion correction and interpolation processing have been performed; pixel coordinate conversion section 111 that performs rearrangement of pixel coordinates on each of the frame images before the interpolation processing by using the distortion correction conversion formula and the alignment conversion formula for the cropped region; and image synthesis section 112 that synthesizes the cropped images corresponding to the plurality of frames on which the rearrangement has been performed by pixel coordinate conversion section 111.

With this configuration, pixel values for the source images before interpolation processing are used without any change during actual synthesis, and therefore no aliasing high-frequency components are lost in the plurality of cropped images on which the alignment has been performed and which are used for synthesis. Consequently, a synthesized image including high-frequency components (super-resolution image) can be obtained, i.e., a high super-resolution effect can be obtained.

Figure 9:
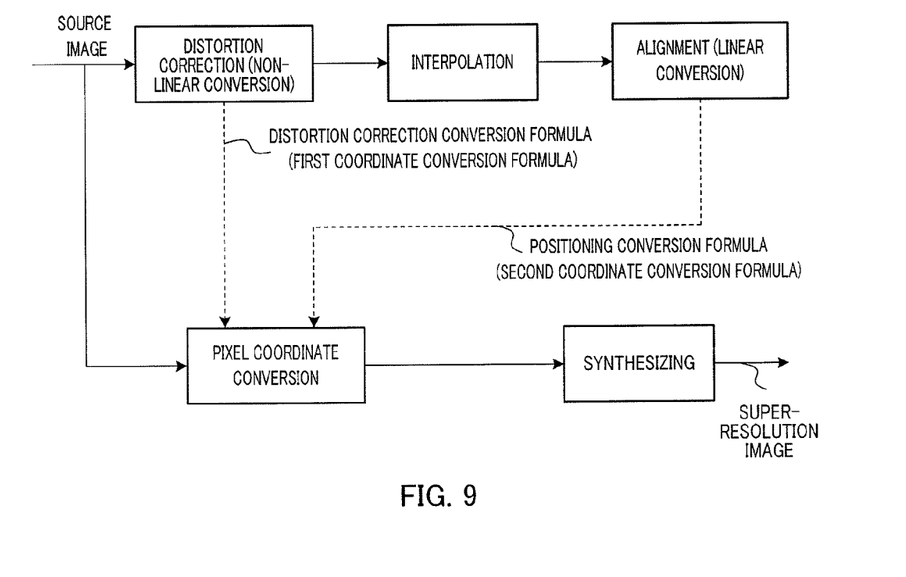
FIG. 9 is a diagram summarizing a characteristic processing flow according to the present invention.

FIG. 9 is a diagram illustrating a characteristic processing flow according to the present invention. On the other hand, FIG. 10 shows how super-resolution processing in general is performed.

Figure 10:
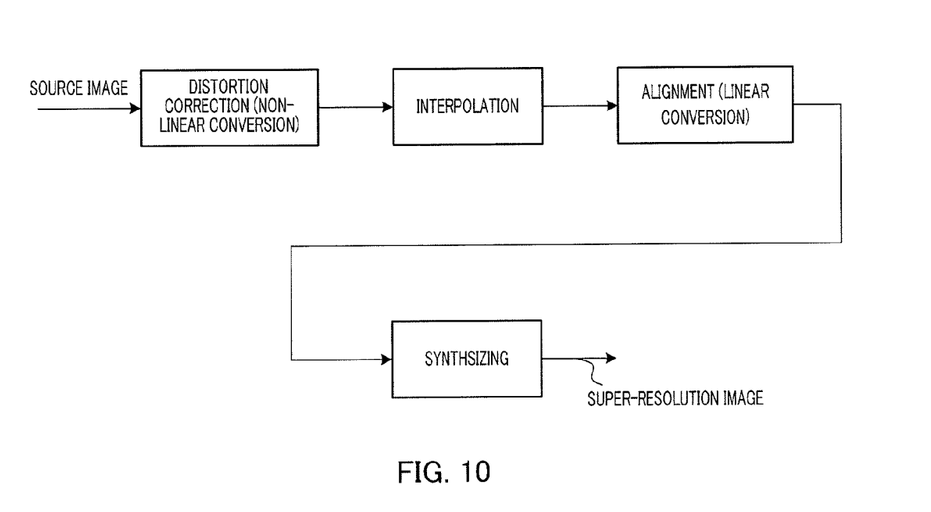
FIG. 10 is a diagram illustrating how typical super-resolution processing is performed.

In the general super-resolution processing shown in FIG. 10, images are synthesized after distortion correction, interpolation, and alignment processing. On the other hand, in the super-resolution processing according to the present invention shown in FIG. 9, distortion correction, interpolation, and alignment processing are performed to obtain a coordinate conversion formula, and an actual super-resolution image is produced by coordinate conversion using the coordinate conversion formula (pixel rearrangement) and synthesis and by using pixel values for source images without any change (i.e., without using pixels that have been subjected to interpolation processing). As a result of this, according to the present invention, a synthesized image including high-frequency components (super-resolution image) can be obtained.

Incidentally, video signal processing apparatus 100 according to the embodiment described above can be configured by a computer such as a personal computer including a memory and a CPU. Furthermore, the functions of the components included in video signal processing apparatus 100 can be implemented by reading out and executing by the CPU, a computer program stored on the memory.

The disclosure of the specification, drawings, and abstract included in Japanese Patent Application No. 2010-289911 filed on Dec. 27, 2010 is incorporated herein by reference in its entirety.

INDUSTRIAL APPLICABILITY

The present invention is suitable for a video signal processing apparatus and a video signal processing method that perform super-resolution processing on a photographed image having nonlinear distortion, which image has been photographed by a camera having a special optical system, such as a 360-degree camera.

REFERENCE SIGNS LIST

100 Video signal processing apparatus
101 Distortion correction and interpolation processing section
102 Alignment processing section
103 Template storage section
104 Alignment conversion formula calculation section
105 Image conversion formula calculation section
111 Pixel coordinate conversion section
112 Image synthesis section
113 Image interpolating section
121 Cropped region determining section 122 Projection system storage section
123 Distortion-correction conversion-formula calculation section
S1 Input image
$C_n$ Distortion correction conversion formula
$H_n$ Alignment conversion formula

The invention claimed is:

1. A video signal processing apparatus, comprising:
a first calculator that receives a plurality of original input image frames, each of which having a different non-linear distortion, and calculates first coordinate conversion formulas, corresponding to each of the original input image frames, correcting non-linear distortion corresponding to a cropped region, capturing an object of each of the frame images;
a distortion correction and interpolation processor that generates a plurality of distortion corrected images by performing distortion correction on the cropped region of each of the original input frame images according to each of the first coordinate conversion formulas and generates a plurality of interpolation processed images by performing interpolation processing on each of the distortion corrected images;
a second calculator that calculates second coordinate conversion formulas correcting the interpolation processed images so that a position of the object captured in each of the interpolation processed images matches each other;
an image coordinate conversion formula calculator that calculates integrated coordinate conversion formulas by integrating the first coordinate conversion formulas and the second coordinate conversion formulas;
a pixel coordinate converter that generates pixel rearranged images by performing rearrangement of pixel coordinates on at least the cropped region of each of the original input frame images using the integrated coordinate conversion formula corresponding to each of the original input image frames; and
a synthesizer that generates a synthesized image by synthesizing the rearranged images.

2. The video signal processing apparatus according to claim 1, further comprising:
an interpolation processor that performs interpolation processing on the synthesized image obtained by the synthesizer.

3. A camera system, comprising:
a camera that photographs an image having non-linear distortion; and
the video signal processing apparatus according to claim 1 that performs processing on the photographed image.

4. A video signal processing method, comprising:
receiving a plurality of original input image frames, each having a different non-linear distortion;
calculating first coordinate formulas, corresponding to each of the original input image frames, correcting non-linear distortion corresponding to a cropped region, capturing an object, of each of the frame images;
generating a plurality of distortion corrected images by performing distortion correction on the cropped region of each of the original input frame images according to each of the first coordinate conversion formulas, and generating a plurality of interpolation processed images by performing interpolation processing on each of the distortion corrected images;
calculating second coordinate conversion formulas correcting the interpolation processed images so that pixel positions in the object captured correspond with pixel positions in each of the interpolation processed images;
calculating integrated coordinate conversion formulas by integrating the first coordinate conversion formulas and the second coordinate conversion formulas;
generating pixel rearranged images by performing rearrangement of pixel coordinates on at least the cropped region of each of the original input frame images using the integrated coordinate conversion formula corresponding to each of the original input image frames; and
generating a synthesized image by synthesizing the rearranged images.

5. The video signal processing apparatus according to claim 1, further comprising:
a region cropper that decides the cropped region corresponding to at least a portion of each of the original input image frames so that the cropped region captures the object.

6. The video signal processing apparatus according to claim 5,
wherein the region cropper performs tracking of the object captured in each of the original input image frames captured by a camera at different times.

7. The video signal processing apparatus according to claim 6,
wherein the region cropper decides a position of the cropped region based on the tracking.

8. The video signal processing apparatus according to claim 5,
wherein the region cropper decides a position of the cropped region in response to a user input.

9. The video signal processing apparatus according to claim 1, further comprising:
a memory that stores parameters for calculating a distortion corresponding to each of positions of the original input image frames.

10. The video signal processing apparatus according to claim 1,
wherein the first calculator calculates the first coordinate conversion formula based on position information of the cropped region and parameters for calculating a distortion corresponding to each of positions of the original input image frame.

11. The video signal processing apparatus according to claim 1, further comprising:
an output that outputs the synthesized image or an image further processed based on the synthesized image.

12. The video signal processing apparatus according to claim 1,
wherein the pixel coordinate convertor performs (1) distortion correction according to the first coordinate conversion formulas, and (2) rearrangement of pixel coordinates according to the second coordinate conversion formulas, on the cropped region corresponding to each of the original input frame images.

13. A video signal processing apparatus, comprising:
a first calculator that receives a plurality of original input image frames, each of which having a different non-linear distortion, and calculates first coordinate conversion formulas, corresponding to each of the original input image frames, correcting non-linear distortion corresponding to a cropped region, capturing an object of each of the frame images;
a distortion correction and interpolation processor that generates a plurality of distortion corrected images by performing distortion correction on the cropped region of each of the original input frame images according to each of the first coordinate conversion formulas and generates a plurality of interpolation processed images by performing interpolation processing on each of the distortion corrected images;

a second calculator that calculates second coordinate conversion formulas correcting the interpolation processed images so that a position of the object captured in each of the interpolation processed images matches each other;

a pixel coordinate converter that generates pixel rearranged images by performing rearrangement of pixel coordinates on at least the cropped region of each of the original input frame images using the first coordinate conversion formula for correcting each non-linear distortion of the original input image frames and the second coordinate conversion formula for correcting the original input image frames so that a position of the object captured in each of the original input image frames matches each other; and a synthesizer that generates a synthesized image by synthesizing the rearranged images.

* * * * *